(12) United States Patent
Staufer et al.

(10) Patent No.: US 12,328,575 B2
(45) Date of Patent: Jun. 10, 2025

(54) AUTHENTICATION BETWEEN USER EQUIPMENT AND COMMUNICATION NETWORK FOR ONBOARDING PROCESS

(71) Applicant: Nokia Technologies Oy, Espoo (FI)

(72) Inventors: Markus Staufer, Munich (DE); Rainer Liebhart, Munich (DE); Sumesh Parameswaran Nair, Aluva (IN); Bo Holm Bjerrum, Nibe (DK)

(73) Assignee: Nokia Technologies Oy, Espoo (FI)

( * ) Notice: Subject to any disclaimer, the term of this patent is extended or adjusted under 35 U.S.C. 154(b) by 402 days.

(21) Appl. No.: 17/879,101

(22) Filed: Aug. 2, 2022

(65) Prior Publication Data

US 2023/0045417 A1 Feb. 9, 2023

(30) Foreign Application Priority Data

Aug. 6, 2021 (IN) .............................. 202141035567

(51) Int. Cl.
| | |
|---|---|
| *H04W 12/03* | (2021.01) |
| *H04W 8/18* | (2009.01) |
| *H04W 12/06* | (2021.01) |
| *H04W 60/00* | (2009.01) |

(52) U.S. Cl.
CPC ............. *H04W 12/06* (2013.01); *H04W 8/18* (2013.01); *H04W 60/00* (2013.01)

(58) Field of Classification Search
CPC ....... H04W 12/06; H04W 8/18; H04W 60/00; H04W 4/70; H04W 4/50; H04W 12/069
See application file for complete search history.

(56) References Cited

U.S. PATENT DOCUMENTS

| | | | | |
|---|---|---|---|---|
| 2020/0396673 | A1* | 12/2020 | Tiwari | ................... H04W 76/27 |
| 2022/0046752 | A1* | 2/2022 | Lee | ........................ H04W 76/40 |

(Continued)

FOREIGN PATENT DOCUMENTS

| | | |
|---|---|---|
| EP | 4030818 A1 | 7/2022 |
| WO | PCT/EP2022/071894 | 11/2011 |

(Continued)

OTHER PUBLICATIONS

3GPP, "3rd Generation Partnership Project; Technical Specification Group Services and System Aspects; Study on Enhanced Support of Non-Public Networks (NPN)—Release 17," 3GPP TR 23.700-07, V17.0.0, Mar. 31, 2021, 248 pages.

(Continued)

*Primary Examiner* — Dhaval V Patel

(74) *Attorney, Agent, or Firm* — Ryan, Mason & Lewis, LLP

(57) ABSTRACT

Techniques are disclosed for security management during an onboarding process for user equipment. For example, from a perspective of an onboarding network, a method comprises authenticating, via the onboarding network, user equipment based on an onboarding record previously configured for the (Continued)

user equipment or a set of user equipment and maintained by the onboarding network. Upon successful authentication, a communication session is established from the onboarding network to a provisioning server for remote provisioning of the user equipment. Advantageously, the onboarding process is performed without a default credential server.

20 Claims, 5 Drawing Sheets

(56) References Cited

U.S. PATENT DOCUMENTS

| | | | | |
|---|---|---|---|---|
| 2023/0171603 | A1* | 6/2023 | Garcia Martin | H04W 60/04 |
| | | | | 455/410 |
| 2023/0231851 | A1* | 7/2023 | Kunz | H04W 60/06 |
| | | | | 455/411 |
| 2023/0269582 | A1* | 8/2023 | Castellanos Zamora | |
| | | | | H04L 65/1016 |
| | | | | 455/410 |
| 2023/0276392 | A1* | 8/2023 | Ianev | H04W 60/00 |
| | | | | 455/435.1 |
| 2023/0292125 | A1* | 9/2023 | Ben Henda | H04W 12/06 |
| 2023/0379168 | A1* | 11/2023 | Fu | H04W 88/04 |

FOREIGN PATENT DOCUMENTS

| | | | | |
|---|---|---|---|---|
| WO | WO-2020071847 | A1 * | 4/2020 | ............. H04W 4/08 |
| WO | 2021/063413 | A1 | 4/2021 | |

OTHER PUBLICATIONS

3GPP, "3rd Generation Partnership Project; Technical Specification Group Services and System Aspects; System Architecture for the 5G System (5GS); Stage 2 (Release 16)" 3GPP TS 23.501, V16.5.0, Jul. 2020, 441 pages.

3GPP, "3rd Generation Partnership Project; Technical Specification Group Services and System Aspects; Procedures for the 5G System (5GS); Stage 2 (Release 16)" 3GPP TS 23.502, V16.3.0, Dec. 2019, 558 pages.

3GPP, "3rd Generation Partnership Project; Technical Specification Group Services and System Aspects; Security Architecture and Procedures for 5G System (Release 15)" 3GPP TS 33.501, V15.1.0, Jun. 2018, 152 pages.

3GPP, "3rd Generation Partnership Project; Technical Specification Group Services and System Aspects; Study on Enhanced Security Support for Non-Public Networks (NPN); (Release 17)" 3GPP TS 33.857, V17.1.0, Mar. 2022, 86 pages.

* cited by examiner

AUTHENTICATION BETWEEN USER EQUIPMENT AND COMMUNICATION NETWORK FOR ONBOARDING PROCESS

FIELD

The field relates generally to communication networks, and more particularly, but not exclusively, to security management in such communication networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

It is to be further noted that TS 23.501 and TS 33.501 also refer to an onboarding process for the UE, referred to as "UE onboarding" or "device onboarding" (or more generally the onboarding process). More particularly, onboarding is the process by which new devices coming online for the first time are provisioned. The new device gains baseline connectivity and networking services so that the device can then bootstrap itself with further network or application layer procedures.

Security management is an important consideration in any communication system. However, due to continuing attempts to improve the architectures and protocols associated with a 5G network in order to increase network efficiency and/or subscriber convenience, security management issues can present a significant challenge, especially with respect to the onboarding process.

SUMMARY

Illustrative embodiments provide techniques for security management during an onboarding process for user equipment.

For example, in one illustrative embodiment from a perspective of user equipment, a method comprises causing, by the user equipment, initiation of an authentication process between the user equipment and an onboarding network, wherein the authentication process is based on at least one onboarding record previously configured for the user equipment or a set of user equipment via the onboarding network and maintained by the onboarding network. Upon successful completion of the authentication process, a communication session is requested through the onboarding network to a provisioning server for remote provisioning of the user equipment.

By way of further example, in one illustrative embodiment from a perspective of an onboarding network, a method comprises authenticating, via the onboarding network, user equipment based on an onboarding record previously configured for the user equipment or a set of user equipment and maintained by the onboarding network. Upon successful authentication, a communication session is established from the onboarding network to a provisioning server for remote provisioning of the user equipment.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, the onboarding process is performed without a default credential server.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other details that one of ordinary skill in the art will realize. For example, TR 33.857 entitled "Technical Specification Group Services and System Aspects; Study on Enhanced Security Support for Non-Public Networks (NPN);" the disclosure of which is incorporated by reference herein in its entirety, may be mentioned below or otherwise applicable in the context of some illustrative embodiments. However, while well-suited for 5G-related 3GPP standards, embodiments are not necessarily intended to be limited to any particular standards.

Furthermore, as illustratively used herein, various abbreviations will be referenced including, but not limited to, the following:
AMF: Access and Mobility management Function
API: Application Programming Interface
AUSF: Authentication Server Function
CA: Certificate Authority
DCO: DCS Owner
DCS: Default Credential Server
DNS: Domain Name Server
FQDN: Fully Qualified Domain Name
HNI: Home Network Identity
NEF: Network Exposure Function
NF: Network Function
ONN: Onboarding Network
ON-SNPN: Onboarding SNPN
ON-SUPI: Onboarding SUPI
PCF: Policy Control Function
PEI: Permanent Equipment Identifier
PVS: Provisioning Server
SMF: Session Management Function
SNPN: Standalone Non-Public Network
SO-SNPN: Subscription Owner Standalone Non-Public Network
SUCI: Subscription Concealed Identifier
SUPI: Subscription Permanent Identifier
UDR: Unified Data Repository
UPF: User Plane Function Prior to describing illustrative embodiments, a general description of certain main components of a 5G network will be described below in the context of FIGS. 1 and 2, followed by a description of an existing process for UE onboarding to such a 5G network.

Figure 1:
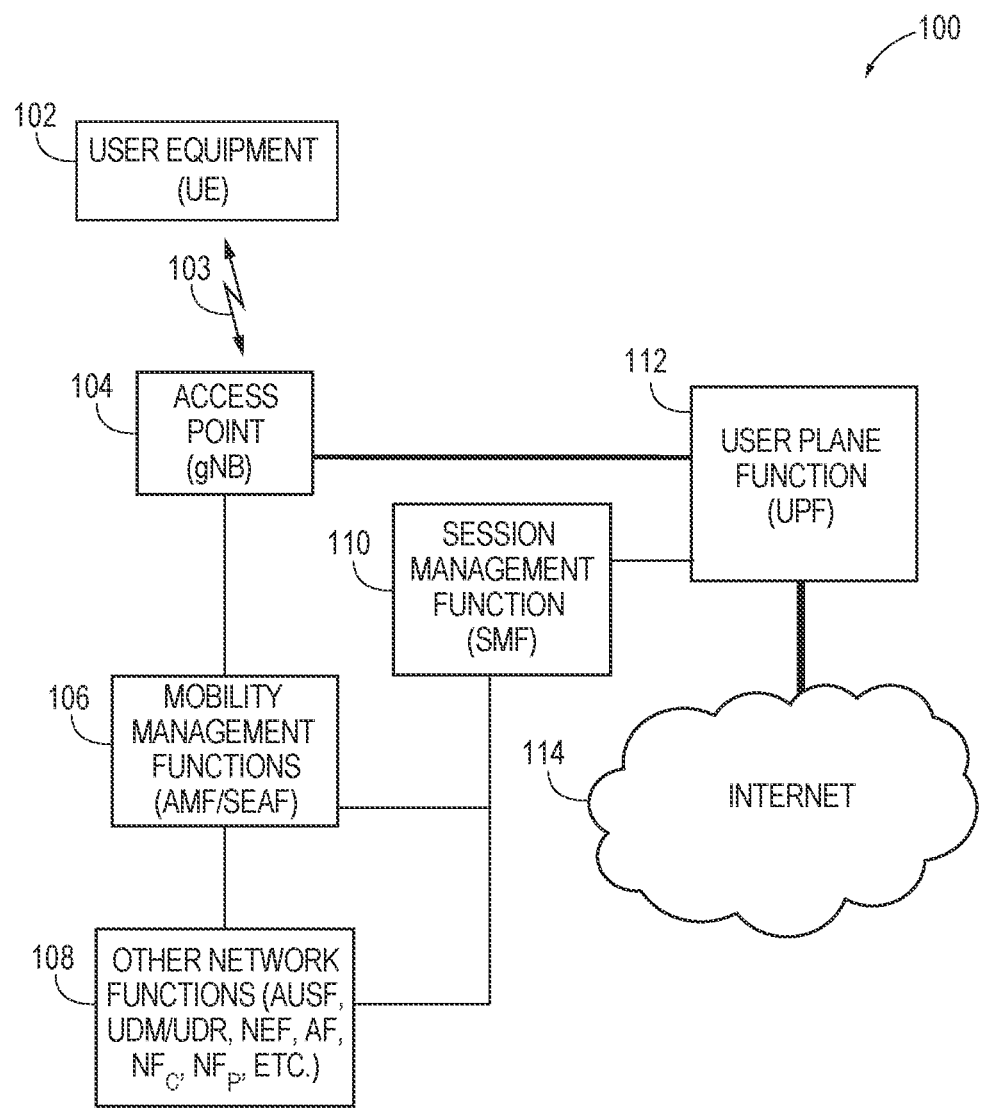
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network such as an N3IWF (Non-3GPP Interworking Function), a TNGF (Trusted Non-3GPP Gateway Function) or a W-AGF (Wireline Access Gateway Function) or may correspond to a legacy access point (e.g., eNB).

The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility operations with the UE (through the access point 104). The AMF may also be referred to herein, more generally, as an access and mobility management entity.

The AMF 106 in this illustrative embodiment is operatively coupled to other network functions 108. As shown, some of functions 108 may include a Unified Data Management (UDM) function, a Unified Data Repository (UDR), as well as an Authentication Server Function (AUSF). The AUSF and UDM/UDR (separately or collectively) are also referred to herein, more generally, as an authentication entity. In addition, functions 108 may include, but are not limited to, a Network Exposure Function (NEF), an Application Function (AF), and other network functions that can act as service producers (NFp) and/or service consumers (NFc). Note that any network function can be a service producer for one service and a service consumer for another service. Further, when the service being provided includes data, the data-providing NFp is referred to as a data producer, while the data-requesting NFc is referred to as a data consumer. A data producer may also be an NF that generates data by modifying or otherwise processing data produced by another NF.

Note that a UE, such as UE 102, is typically subscribed to what is referred to as a Home Public Land Mobile Network (HPLMN) in which some or all of the functions 106 and 108 reside. The HPLMN is also referred to as the Home Environment (HE). If the UE is roaming (not in the HPLMN), it is typically connected with a Visited Public Land Mobile Network (VPLMN) also referred to as a visited network, while the network that is currently serving the UE is referred to as a serving network. In the roaming case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein are not limited by which functions reside in which PLMN (i.e., HPLMN or VPLMN).

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that network 114 in FIG. 1 may additionally or alternatively represent other network infrastructures including, but not limited to, cloud computing infrastructure and/or Edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
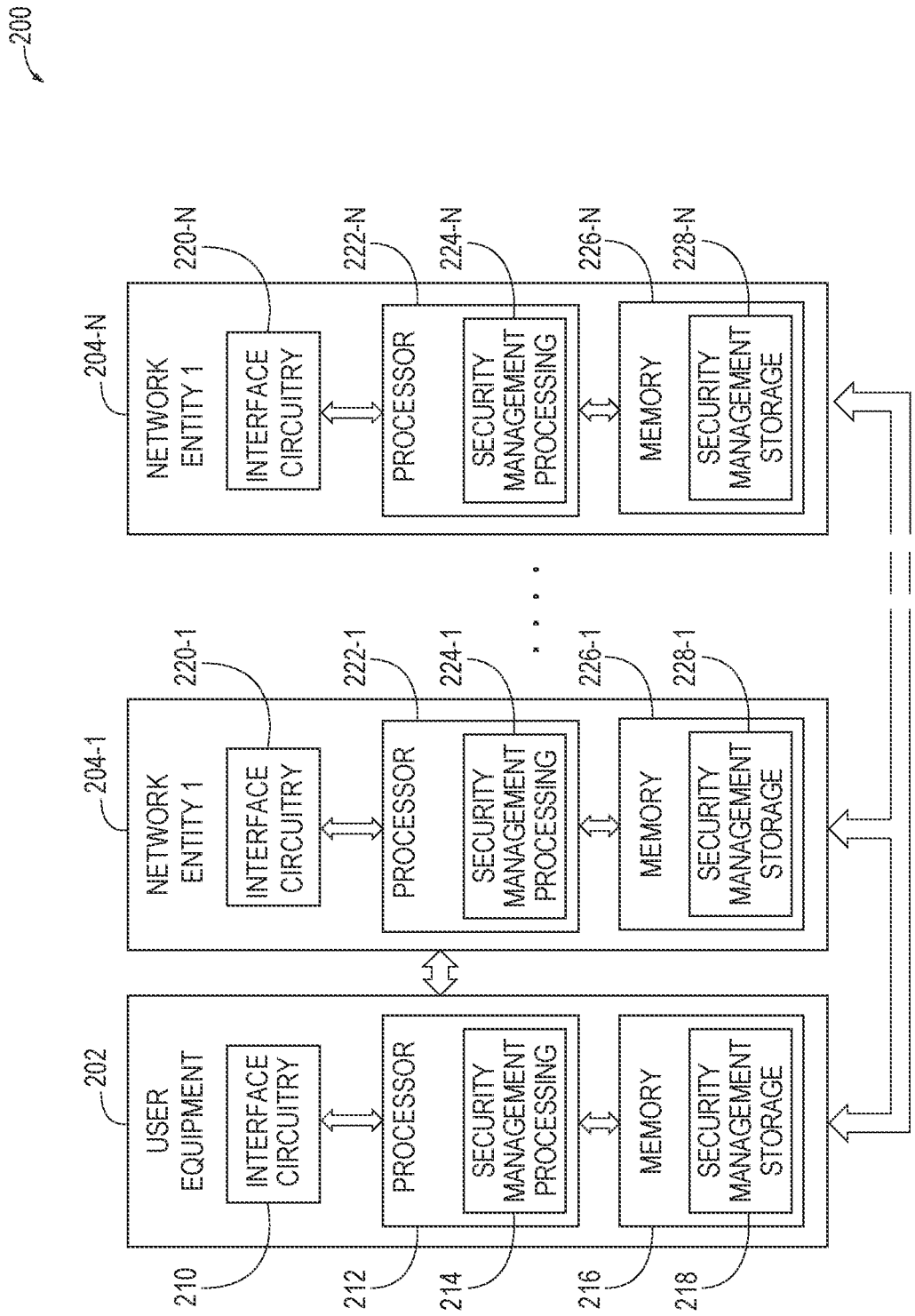
FIG. 2 illustrates user equipment and network entities with which one or more illustrative embodiments may be implemented.

FIG. 2 is a block diagram illustrating computing architectures for various participants in methodologies according to illustrative embodiments. More particularly, system 200 is shown comprising user equipment (UE) 202 and a plurality of network entities 204-1, . . . , 204-N. For example, in illustrative embodiments and with reference back to FIG. 1, UE 202 can represent UE 102, while network entities 204-1, . . . , 204-N can represent functions 106 and 108. It is to be appreciated that the UE 202 and network entities 204-1, . . . , 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

Each of the network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each network entity 204 includes a security management processing module 224 (224-1, . . . , 224-N) that may be implemented at least in part in the form of software executed by the processor 222. The processing module 224 performs security management operations described in conjunction with subsequent figures and otherwise herein. Each memory 226 of each network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of network entities 204 are configured for communication with each other as security management participants via their respective interface circuitries 210 and 220. This communication involves each participant sending data to and/or receiving data from one or more of the other participants.

The term "data" as used herein is intended to be construed broadly, so as to encompass any type of information that may be sent between participants including, but not limited to, identity data, key pairs, key indicators, security management messages, registration request/response messages and data, request/response messages, authentication request/response messages and data, metadata, control data, audio, video, multimedia, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5G system architecture as service-based, e.g., Service-Based Architecture (SBA). It is realized herein that in deploying different NFs, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces).

Given the above general description of some illustrative features of a 5G network, problems with existing UE onboarding approaches and solutions proposed in accordance with illustrative embodiments will now be described herein below.

As mentioned above in the background section, onboarding is the process by which new devices coming online for the first time (say, for example, UE 102) are provisioned. Existing UE onboarding involves, for example, the following steps (for further details see the above-mentioned TS 23.501 and TS 33.501):

(i) During manufacturing, the UE receives a set of default credentials including a unique identifier, known as an onboarding SUPI (ON-SUPI), a private key and a corresponding certificate used to cryptographically protect the ON-SUPI.

(ii) The ON-SUPI and the corresponding certificate are issued by an entity referred to as Default Credential Owner (DCO), which typically could be the device manufacturer.

(iii) If an onboarding UE connects to an onboarding network, such as an onboarding Standalone Non-Public Network (ON-SNPN) using its default credentials, the ON-SNPN invokes an authentication server, known as a Default Credential Server (DCS), operated by the DCO (see 3GPP TS 23.501).

(iv) After successful authentication, the onboarding UE can establish user plane (UP) connectivity, which is only allowed to be used for provisioning purposes. That is, only connections to a Provisioning Server (PVS) or Domain Name Server (DNS) are possible.

(v) The onboarding UE establishes a connection to the PVS and receives SO-SNPN specific credentials from the PVS.

Onboarding solutions currently endorsed by 3GPP include deployment of a DCS operated by a DCO. However, it is realized herein that such an implementation adds extra effort for integration between the onboarding network (which, in principle, can be multiple networks) and the DCS. Since the number of onboarding networks and DCOs may potentially be very large, this increases the burden for the ecosystem to properly deploy the onboarding service across different networks and domains.

It is also realized herein that deploying a DCS adds a security risk, since it opens the possibility for an onboarding UE to connect to a server outside of the domain of the ON-SNPN. This is a particular problem for special purpose networks (e.g., industrial, critical infrastructure or military), where security is strictly based on the concept of isolation.

Accordingly, a solution needs to restrict access to an ON-SNPN to UEs, which are authorized by the ON-SNPN or an entity trusted by the ON-SNPN, and to restrict connectivity services to the remote provisioning process only (i.e., allow the onboarding UE to connect only to the PVS or DNS).

Illustrative embodiments provide solutions which address the above and other challenges associated with existing approaches by providing mutual authentication between an onboarding UE and an onboarding network using default credentials without the need to deploy a DCS. For example, in some illustrative embodiments, the default credentials deployed on the UE comprise a private key and a certificate issued by the DCO, which can be verified by the ON-SNPN using a certificate issued by a Certificate Authority (CA) used to sign the default certificate of the UE. The concept of configurable onboarding records is introduced, in accordance with illustrative embodiments, to restrict access of authorized onboarding UEs and restrict connectivity services to the remote provisioning process only.

Figure 3:
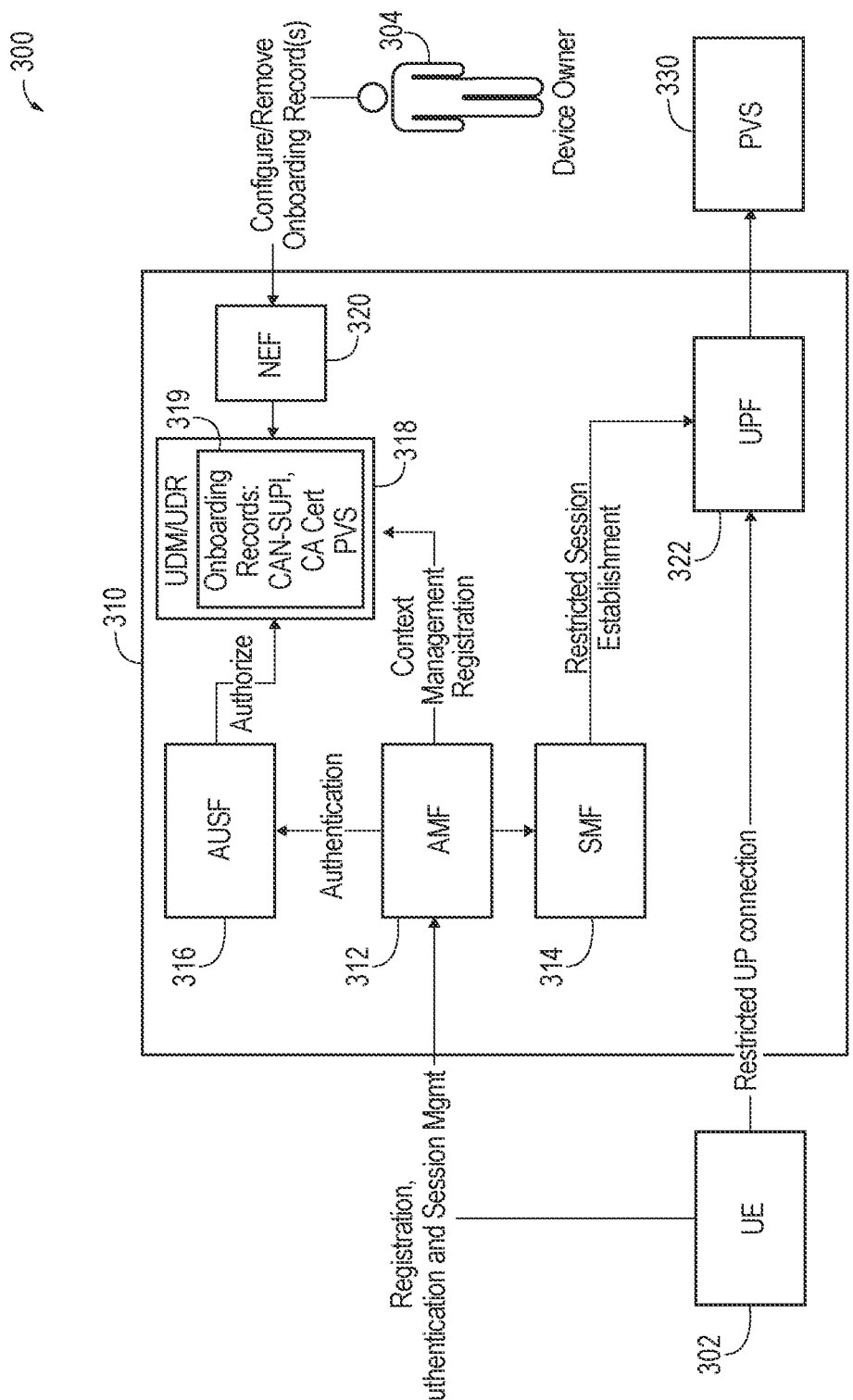
FIG. 3 illustrates an onboarding process for user equipment with respect to a communication network according to an illustrative embodiment.

By way of example, FIG. 3 illustrates an onboarding process 300 for user equipment according to an illustrative embodiment. As shown, assume that UE 302 is an onboarding UE and device owner 304 represents the manufacturer or other owner of UE 302. Note that device owner 304 can be an individual, a computing system or other processing device, or other entity through which the manufacturer interacts with communication network 310. Further assume that communication network 310 is the network with which UE 302 is performing the onboarding process, i.e., the ON-SNPN. As shown, communication network 310 comprises AMF 312, SMF 314, AUSF 316, UDM/UDR 318, NEF 320 and UPF 322. It is to be appreciated that communication network 310 can comprise other NFs that are not expressly shown. Further, as is evident and as will be explained further below, onboarding process 300 is performed without the need to deploy a DCS.

In general, as shown in FIG. 3, UE 302 communicates with communication network 310 via AMF 312 for registration, authentication and session management purposes. Note that for the sake of simplicity of illustration, the radio access network (e.g., including one or more gNBs) that connects UE 302 and communication network 310 is not expressly shown. AMF 312, in conjunction with AUSF 316 and UDM/UDR 318, performs authentication (authorization) of UE 302, and performs context management registration for UE 302 with UDM/UDR 318. Once UE 302 is authenticated, SMF 314 establishes, via UPF 322, a restricted session with PVS 330 for UE 302.

More particularly, as shown, device owner 304 provides information to UDM/UDR 318 through NEF 320 to configure onboarding record 319. Alternatively, device owner 304 can provide such information through another NF or directly via an interface (e.g., an application programming interface or API) provided by UDM/UDR 318. Device owner 304 can provide a single ON-SUPI, a range of single ON-SUPIs, a domain or any other information to allow addressing onboarding record 319 in UDM/UDR 318. For that purpose, it is assumed that there is an agreement between device owner 304 and potential onboarding networks, i.e., ON-SNPN such as communication network 310, via which device owner 304 is granted access to NEF 318, another NF or UDM/UDR 318 and which is used to authorize requests from device owner 304.

UDM/UDR 318 or any other network function stores onboarding record 319. By way of example, onboarding record 319 comprises an ON-SUPI (or ON-SUCI), a CA Certificate, and PVS information and any other information used for onboarding. The CA Certificate information is used by AUSF 316 to verify a certificate provided by UE 302. The PVS information may comprise a Fully Qualified Domain Name (FQDN) and/or Internet Protocol (IP) address for PVS 330 used during the remote provisioning portion of the process (via PVS 330) which happens after successful primary authentication of the onboarding UE 302. Onboarding record 319 in UDM/UDR 318 can be accessed by using the ON-SUPI or any other identifier that is securely stored on the device (e.g., a Permanent Equipment Identifier or PEI) or part of the device certificate of UE 302. Onboarding records can be stored by UDM/UDR 318 per device or per group of devices. In case of using the ON-SUPI as an access key, in accordance with one or more illustrative embodiments and as mentioned above, there can be one onboarding record for a single onboarding SUPI (device12345@example.com), for a range of onboarding SUPIs, or one record for the entire onboarding SUPI domain (example.com). In the same way there can be one FQDN/IP address for PVS 330 stored per ON-SUPI or one FQDN/IP address for PVS 330 for a group of ON-SUPIs or for all ON-SUPIs belonging to a certain domain or sub-domain.

AUSF 316 and UDM/UDR 318 are adapted to enable authentication of onboarding UEs using onboarding records and, for example, using root certificates stored in these records. Thus, for example as shown, AUSF 316 authorizes UE 302 using onboarding record 319 stored in UDM/UDR 318. Furthermore, AMF 312 selects AUSF 316 based on ON-SUPI/ON-SUCI or any other identifier received from UE 302. AMF 312 retrieves the FQDN/IP address for PVS 330 or other information from UDM/UDR 318 during onboarding registration of UE 302.

Onboarding records such as onboarding record 319 can be removed (deleted) from the UDM/UDR 318. This can be done by device owner 304 via an explicit request through NEF 320, another NF or the UDM/UDR 318 directly once the remote provisioning of UE 302 is successfully executed. Alternatively, UDM/UDR 318 can implicitly remove onboarding record 319 triggered by the de-registration of UE 302 from the onboarding network, i.e., communication network 310. Furthermore, onboarding record 319 can have a limited lifetime and be automatically deleted after the lifetime has expired, i.e., onboarding is limited to the time window defined by the lifetime of onboarding record 319, and UE 302 is de-registered by communication network 310 once onboarding record 319 is automatically deleted.

Figure 4:
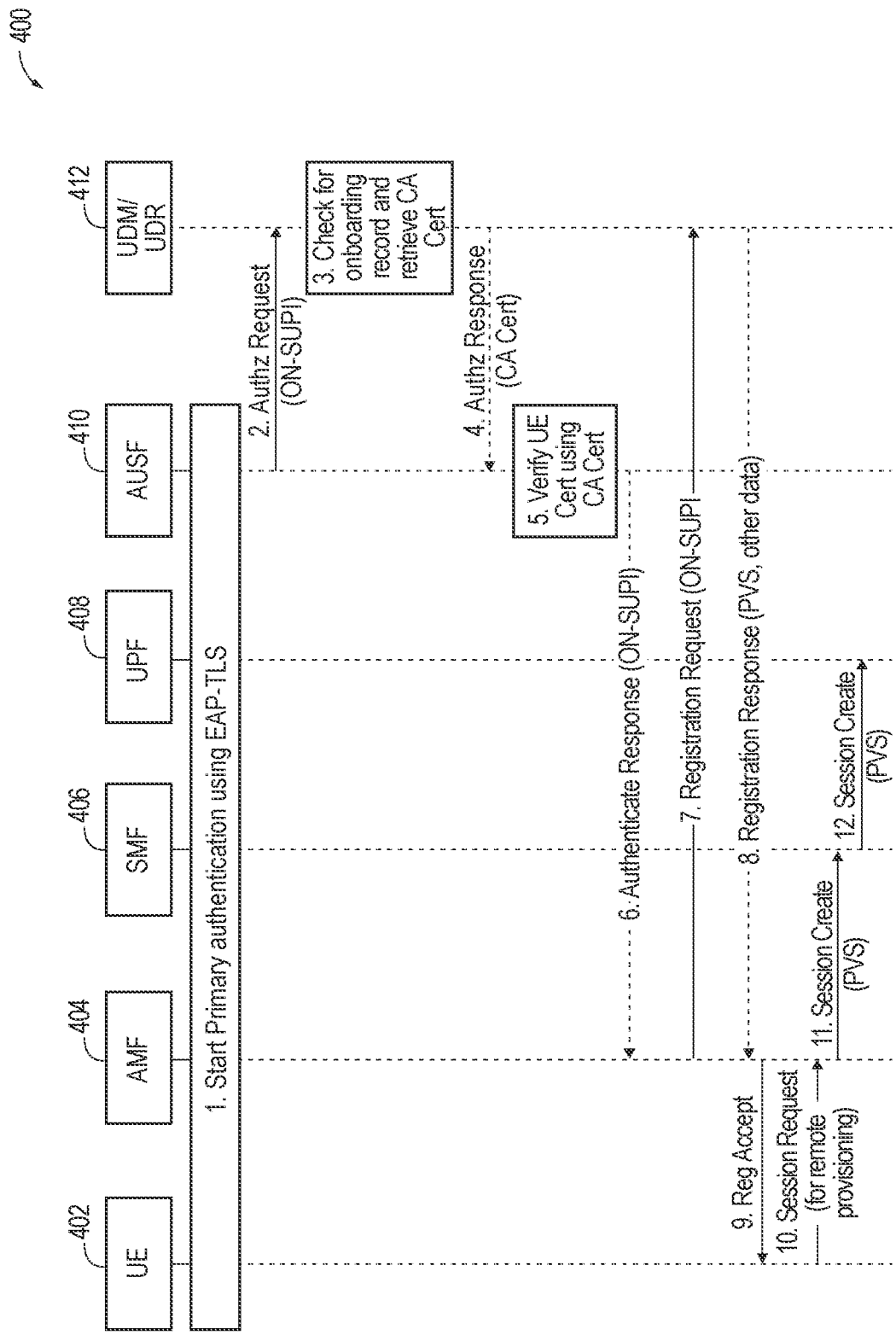
FIG. 4 illustrates a signaling flow in an onboarding process for user equipment according to an illustrative embodiment.

FIG. 4 illustrates a signaling flow 400 in an onboarding process for user equipment according to an illustrative embodiment. As shown, signaling flow 400 involves participants: UE 402, AMF 404, SMF 406, UPF 408, AUSF 410 and UDM/UDR 412. As will be evident, the participants in signaling flow 400 have the same or similar functionalities as the components described above in the context of FIG. 3. It is to be appreciated that while the description of steps in signaling flow 400 assume use of an ON-SUPI for identification of the onboarding record, another identifier can be used in alternative embodiments.

In step 1, UE 402 and AUSF 410 start executing primary authentication using Extensible Authentication Protocol—Transport Layer Security (EAP-TLS). However, one or more alternative primary authentication methods may be used. AUSF 410 derives, from an authentication request received from AMF 404, that the onboarding process for UE 402 needs to be executed. In one example, a Home Network Identity (HNI) of the SUCI can be set to a predefined value or an onboarding indication can be sent from AMF 404 to AUSF 410. Alternatively, a dedicated SUPI type can be assigned to indicate onboarding. After UE 402 has verified the server certificate of AUSF 410, UE 402 sends its own UE Certificate.

In step 2, AUSF 410 sends an Authorization Request to UDM/UDR 412 using ON-SUPI or any other identifier (e.g., derived from the UE Certificate received in step 1). This Authorization Request can be a completely new request or an extension of an existing request.

In step 3, UDM/UDR 412 checks if an onboarding record exists that matches the ON-SUPI. This check includes individual onboarding records, which cover a single ON-SUPI or a set of ON-SUPIs.

In step 4, if the check in step 3 is successful, UDM/UDR 412 replies to AUSF 410 with the CA Certificate retrieved from the onboarding record; otherwise, UDM/UUDR 412 replies to AUSF 410 with an appropriate error message.

In step 5, AUSF 410 verifies the UE Certificate using the CA Certificate supplied by UDM/UDR 412 in step 4.

In step 6, AUSF 410 finalizes the primary authentication by sending ON-SUPI (along with appropriate 5G keys) to AMF 404.

In step 7, AMF 404 sends Registration Request to UDM/UDR 412 using ON-SUPI as a request parameter. For, instance the Udm_UEContextManagement (amf-3ggp-access) Registration Request can be used for this purpose in accordance with an illustrative embodiment.

In step 8, UDM/UDR 412 replies to AMF 404 with a Registration Response including PVS information (e.g., FQDN/IP address) and any other information as may be desired or otherwise needed as per existing protocols or may be needed for the onboarding process. If a Udm_UEContextManagement Registration Request is used in step 7, the Amf3GppAccessRegistration data structure in the Udm_UEContextManagement can be extended for this purpose in accordance with an illustrative embodiment.

Subsequently, restricted user plane connectivity is established using the PVS information and any additional information mentioned above as input, and UE 402 connects to the PVS and receives a regular SO-SNPN subscriber profile from the PVS. This is summarized in steps 9-12.

In step 9, AMF 404 notifies UE 402 that the UE registration has been accepted, and thus remote provisioning can proceed.

In step 10, UE 402 sends a Session Request for remote provisioning to AMF 404.

In step 11, AMF 404 sends a Session Create request to SMF 406 with the PVS information and any additional information mentioned above as input.

In step 12, SMF 406 forwards the Session Create request to UPF 408 which then forwards the Session Create request to the appropriate PVS (not shown), based on the PVS and any other information, such that remote provisioning of UE 402 by the PVS can proceed.

Figure 5:
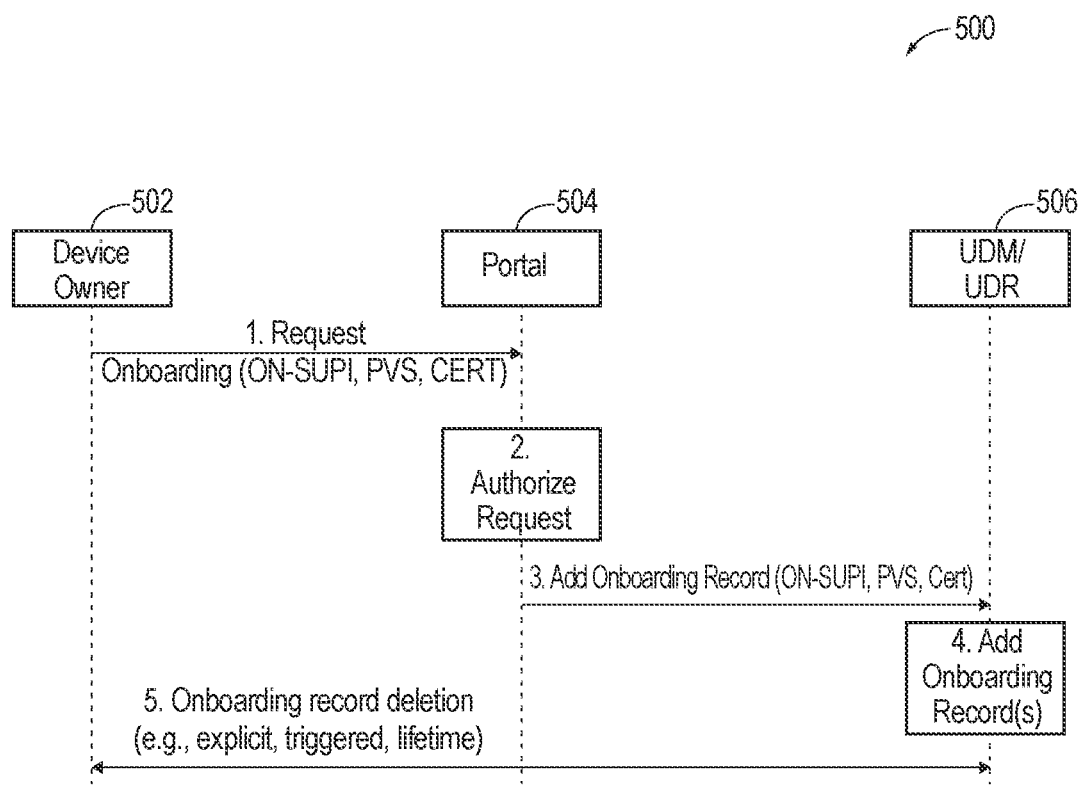
FIG. 5 illustrates a signaling flow for creating/deleting onboarding records for user equipment according to an illustrative embodiment.

FIG. 5 illustrates a signaling flow 500 for creating/deleting onboarding records for user equipment according to an illustrative embodiment. As shown, signaling flow 500 involves participants: device owner 502, portal 504 and UDM/UDR 506. As will be evident, the participants in signaling flow 500 have the same or similar functionalities as the components described above in the context of FIG. 3. Note that portal 504 can, for example, be implemented as part of NEF, another NF, or an API associated with UDM/UDR 506. It is to be appreciated that while the description of steps in signaling flow 500 assume use of an ON-SUPI for identification of the onboarding record, another identifier can be used in alternative embodiments.

In step 1, device owner 502 (or any other entity which is in charge of onboarding a UE) connects with portal 504 of the ON-SNPN (e.g., communication network 310 in FIG. 3). The request from device owner 502 includes the ON-SUPI of the onboarding UE (e.g., UE 302) and the CA Certificate which device owner 502 received from the DCO, as well as the PVS and other information which device owner 502 received from a subscription holder called Subscription Owner SNPN (SO-SNPN).

As mentioned above, portal 504 can be implemented as part of or making use of the NEF of the ON-SNPN, or it can be implemented independent from the NEF of the ON-SNPN, e.g., directly at UDM/UDR 506 or at any other NF.

In step 2, portal 504 authorizes the incoming onboarding request. This includes checking if the requestor (e.g., device owner 502) is entitled and trusted to make the request. For instance, the requestor may be an employee of the ON-SNPN operator or a trusted business partner of the ON-SNPN. The authorization also includes checking if the provided PVS information is in line with policies of the ON-SNPN. For instance, onboarding requests may only be authorized, if ON-SNPN and SNPN (for example, SO-SNPN), which the PVS or other information refers to, have a business agreement in place and executed technical or business related integration steps.

In step 3, after successful authorization, portal 504 sends a request to add a new onboarding record to the UDM/UDR 506 containing ON-SUPI, CA Certificate, PVS and other information to UDM/UDR 506.

It is to be appreciated that the PVS and other information sent in step 3 may not be the same information as the PVS information received in step 2. Rather, portal 504 may execute intermediate steps to derive new PVS information, which is more suited for interpretation by AMF, SMF, PCF and UPF than using the PVS information received in step 2. For instance, device owner 502 may only provide the name of the SO-SNPN, and portal 504 (or any other entity used by the portal) may translate this name into a list of IP addresses or FQDNs known to the ON-SNPN from pre-integration with the SO-SNPN.

In step 4, UDM/UDR 504 adds a new onboarding record for the ON-SUPI(s) including the CA Certificate, the PVS and other information.

As mentioned above in the context of FIG. 3, illustrative embodiments provide methods for deletion of onboarding records from UDM/UDR 506. This onboarding record deletion operation is summarized in step 5.

In one method, device owner 502 (or the entity who initiated the onboarding request) can explicitly request deletion of onboarding records using a similar flow as described in steps 1-4 of FIG. 5. Instead of issuing a "Request Onboarding" command in step 1 to portal 504, device owner 502 issues an "Onboarding Complete" command. After authorization, which can include a check that the requestor is the same as the requestor who previously requested onboarding, portal 504 can trigger deletion of the onboarding records at UDM/UDR 506.

In another method, deletion of the onboarding record can be triggered by the interaction between AMF and UDM. By way of example only, deletion of the onboarding record can be triggered by the Registration Request (step 7 in FIG. 4), or deletion can be triggered by a de-registration request send from AMF to UDM, which takes place after communication between the UE and the PVS has been successfully completed. Another embodiment may comprise the UE, when it de-registers from the ON-SNPN, indicating in the de-registration request to AMF that remote provisioning was successfully completed.

In a further embodiment, as mentioned above, onboarding records may have finite lifetimes. The lifetime parameter can either be defined as part of the "Request Onboarding" command (step 1 in FIG. 5) or the lifetime parameter can be set by the ON-SNPN based on its own policy. By way of example only, the lifetime parameter can be defined by a duration, a time window, or an expiry date. The lifetime parameter can be stored by UDM/UDR 506 together with an onboarding record. UDM/UDR 506 scans on a regular basis all onboarding records and deletes or deactivates all expired onboarding records. In addition, if the lifetime of an onboarding record is defined by a time window with a start time, an onboarding record cannot be used before the start time.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor;
   at least one memory including computer program code;
   the at least one memory and the computer program code being configured to, with the at least one processor, cause the apparatus at least to:
   cause initiation of an authentication process between the apparatus and an onboarding network, wherein the authentication process is based on at least one onboarding record previously configured for the apparatus or a set of apparatus via the onboarding network and maintained by the onboarding network; and
   upon successful completion of the authentication process between the apparatus and the onboarding network, request a communication session through the onboarding network to a provisioning server, external to the onboarding network, for remote provisioning of the apparatus.

2. The apparatus of claim 1, wherein the onboarding network comprises an onboarding standalone non-public network (ON-SNPN).

3. The apparatus of claim 1, wherein the apparatus is part of user equipment configured to access the onboarding network.

4. The apparatus of claim 3, wherein the at least one onboarding record maintained by the onboarding network comprises an onboarding identifier unique to the user equipment.

5. The apparatus of claim 4, wherein the onboarding identifier unique to the user equipment comprises subscription identifier of the user equipment.

6. The apparatus of claim 5, wherein the subscription identifier of the user equipment comprises one of an onboarding Subscription Permanent Identifier (SUPI) and an onboarding Subscription Concealed Identifier (SUCI).

7. A method comprising:
   causing, by user equipment, initiation of an authentication process between the user equipment and an onboarding network, wherein the authentication process is based on at least one onboarding record previously configured for the user equipment or a set of user equipment via the onboarding network and maintained by the onboarding network;
   upon successful completion of the authentication process between the user equipment and the onboarding network, requesting a communication session through the onboarding network to a provisioning server, external to the onboarding network, for remote provisioning of the user equipment; and
   upon successful completion of remote provisioning, de-registering from the onboarding network and providing an indication about successful remote provisioning to the onboarding network in a de-registration request.

8. The method of claim 7, wherein the onboarding network comprises an onboarding standalone non-public network (ON-SNPN).

9. The method of claim 7, wherein the at least one onboarding record maintained by the onboarding network comprises an onboarding identifier unique to the user equipment.

10. The method of claim 9, wherein the onboarding identifier unique to the user equipment comprises one of an onboarding Subscription Permanent Identifier (SUPI) and an onboarding Subscription Concealed Identifier (SUCI).

11. An article of manufacture comprising a non-transitory computer-readable storage medium having embodied therein executable program code that when executed by a processor causes the processor to perform the steps of claim 7.

12. An system comprising:
    one or more processors;
    one or more memories including computer program code;
    the one or more memories and the computer program code being configured to, with the one or more processors, cause the system at least to:
    authenticate, via one or more network entities of an onboarding network, user equipment based on at least one onboarding record previously configured for the user equipment or a set of user equipment and maintained by one of the one or more network entities; and upon successful authentication of the user equipment via the one or more network entities of the onboarding network, enable establishment of a communication session via at least one of the one or more network entities to a provisioning server, external to the onboarding network, for remote provisioning of the user equipment.

13. The system of claim 12, wherein the one of the one or more network entities via which the at least one onboarding record is configured and maintained comprises one or more data management and repository network functions.

14. The system of claim 13, wherein the one or more data management and repository network functions comprise at least one of a Unified Data Management (UDM) function and a Unified Data Repository (UDR) function.

15. The system of claim 13, wherein the one or more data management and repository network functions are operative to: (i) receive configuration information from an ownership entity associated with the user equipment; (ii) create the at least one onboarding record from the received configuration information; and (iii) store the at least one onboarding record.

16. The system of claim 13, wherein the one or more data management and repository network functions are further operative to delete the at least one onboarding record based on one or more of: (i) an explicit request; (ii) a triggering action; and (iii) a lifetime parameter associated with the at least one onboarding record.

17. The system of claim 13, wherein the at least one onboarding record comprises an onboarding identifier unique to the user equipment, and wherein the onboarding identifier unique to the user equipment is useable to access the at least one onboarding record stored by the one or more data management and repository network functions.

18. The system of claim 13, wherein the at least one onboarding record further comprises a plurality of onboarding identifiers respectively unique to a plurality of user equipment.

19. The system of claim 13, wherein the at least one onboarding record further comprises a certificate issued by a certificate authority, and wherein the certificate issued by the certificate authority is useable by another one of the one or more network entities to verify a certificate provided by the user equipment.

20. The system of claim 13, wherein the at least one onboarding record further comprises information for accessing the provisioning server to establish the communication session to remotely provision the user equipment, upon successful authentication.

* * * * *